Figure 1:
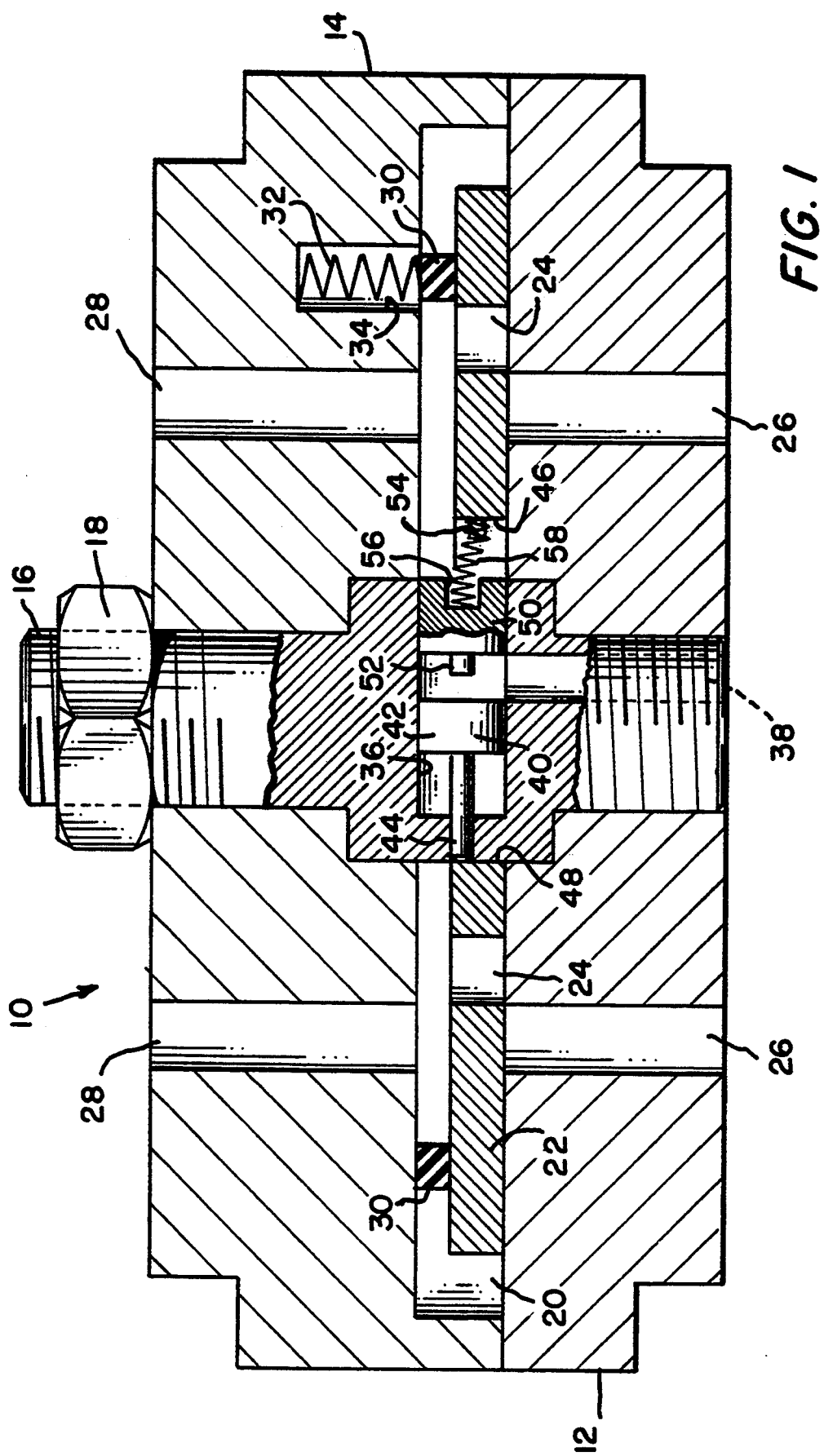

United States Patent [19]

Frazzini

[11] Patent Number: 5,390,698
[45] Date of Patent: Feb. 21, 1995

[54] PLATE-TYPE, UNIDIRECTIONAL-FLOW, FLUID CONTROL VALVE

[75] Inventor: Edward Frazzini, Corning, N.Y.

[73] Assignee: Dresser-Rand Company, Corning, N.Y.

[21] Appl. No.: 218,405

[22] Filed: Mar. 28, 1994

[51] Int. Cl.6 ............................................ F16K 15/00
[52] U.S. Cl. .................................... 137/496; 137/535; 137/516.17
[58] Field of Search .............. 137/496, 511, 516.11, 137/516.17, 535, 538

[56] References Cited

U.S. PATENT DOCUMENTS

| | | | |
|---|---|---|---|
| 3,831,627 | 8/1974 | Hanlon | 137/535 X |
| 4,852,608 | 8/1989 | Bennitt | 137/516.11 X |

Primary Examiner—Robert G. Nilson
Attorney, Agent, or Firm—B. J. Murphy

[57] ABSTRACT

A valve seat and valve guard are coupled together, and form a chamber therebetween within which a valving plate moves. A stud secures the seat and guard together, and has a bore formed therewithin for receiving a headed piston. The piston has a projecting rod which engages the valving plate, and a pilot hole formed in the stud addresses a pressured fluid thereinto for moving the piston, causing the rod to move the plate laterally in the chamber. Apertures in the seat, guard and plate align, when pressured fluid enters the seat apertures, as the plate rises from the seat, and combines with the lateral movement to displace the plate diagonally in the chamber.

11 Claims, 2 Drawing Sheets

PLATE-TYPE, UNIDIRECTIONAL-FLOW, FLUID CONTROL VALVE

This invention pertains to fluid control valves of the plate-type similar to, for example, the Fluid Control Valve, disclosed in U.S. Pat. No. 4,852,608, and issued on Aug. 1, 1989, to Robert A. Bennitt, and in particular to such a plate-type, fluid control valve in which, however, the valving plate moves in elevation and laterally.

Plate-type fluid control valves, in which the valving plate moves laterally, are known in the prior art. Exemplary thereof are the U.S. Pat. No. 4,852,608, issued to John J. Karpis, on Aug. 9, 1988, for a Fluid Flow Regulator, and Japanese patent No. 0031583, issued on Apr. 5, 1991, to Toshio Arii, for a Valve Device for Reciprocating Compressor. However, slidable motion of the valving plate, in the aforecited patents, and in any plate-type, fluid control valve, occasions undue wear, and early mortality of the valve. What has long been needed is a plate-type, fluid control valve in which the valving plate not only rises from the seat, to accommodate fluid flow through the valve, but also displaces laterally as well to prevent wear and scoring of the seat and valving plate.

It is an object of this invention, then, to set forth a plate-type, fluid control valve which satisfies the aforesaid need.

Particularly, it is an object of this invention to disclose a novel, plate-type, fluid control valve, providing unidirectional flow therethrough comprising a valve seat; and a valve guard coupled to said seat; wherein said guard and said seat have means cooperative for forming a chamber therebetween; and a valving plate interposed between said seat and guard, and movable within said chamber for removal from closure thereof upon said seat toward said guard; wherein said seat, guard and plate are apertured to (a) accommodate fluid flow through said valve when said plate removes from said seat, and (b) prohibit fluid flow therethrough when said plate is in closure of, and upon said seat; and means within said valve, and responsive to fluid pressure addressed to said seat, for moving said plate laterally within said chamber.

Figure 2:
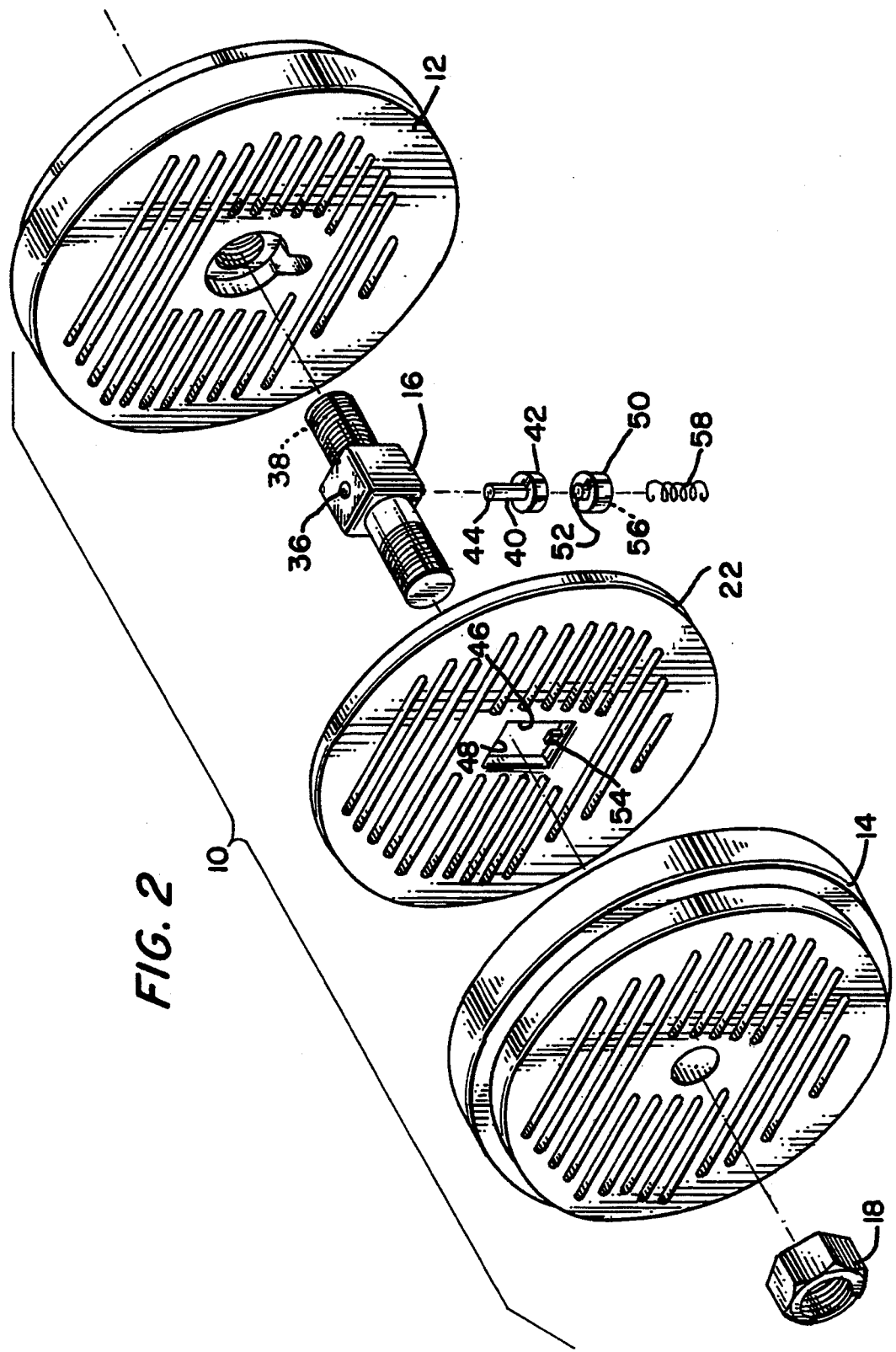

Further objects of this invention, as well as the novel features thereof, will be apparent by reference to the following description, taken in conjunction with the accompanying figures, in which:

FIG. 1 is a cross-sectional view of the novel valve, according to an embodiment thereof; and FIG. 2 is an exploded view of the FIG. 1 embodiment of the valve.

As shown in the figures, the novel valve 10 comprises an apertured valve seat 12, and a valve guard 14, the two being fastened together by means of a threaded stud 16 and a nut 18. The innermost portion of the guard 14 is relieved to cooperate with the seat 12 to define a chamber 20 therebetween. An apertured valving plate 22 is confined within the chamber 20. As shown in FIG. 1, the plate apertures 24 are out of alignment with the apertures 26 and 28 in the seat and guard, respectively, and the plate 22 is in closure of, and upon the seat 12. Consequently, fluid flow through the valve 10 is blocked, and the plate 22 is held against the seat 12 by elastomeric buttons 30 which are biased against the plate 22 by springs 32 nested in bores 34 provided therefor in the guard 14 (only one of the bores 34 and springs 32 are shown). Upon a fluid pressure being addressed to the seat 12, the same passes through the apertures 26 and causes the plate 22 to rise from the seat 12, as is conventional in the known plate-type, unidirectional-flow, fluid control valves. However, the invention comprehends means for also, and coincidentally, causing the plate 22 to move laterally through the chamber 20.

The stud 16 has a transverse bore 36 formed therein of two diameters, and a pilot hole 38 formed therethrough. The hole 38 opens onto the bore 36, at one end thereof, and onto the outermost surface of the seat 12, at the opposite end. A piston 40, having a head 42 and an extending rod 44, is slidably set in the bore 36. Too, the plate 22 has an opening 46 formed therein. One end of the opening 46 comprises a bearing surface 48 with which the rod 44 is engaged. Consequently, when fluid pressure addresses the seat 12, it also enters the pilot hole 38 and displaces the piston 40. The rod 44 pushes the plate 22 to the left (as viewed in FIG. 1) and, simultaneously, of course, the plate 22 removes from the seat 12. The lateral movement of the plate 22 aligns the apertures 24 with the apertures 26 and 28, to permit fluid flow through the valve 10, and the elevation of the plate 22 prevents wear and scoring of the plate 22 and the seat 12.

Also set within the bore 36 is a disc 50. Disc 50 has a stand-off button 52 extending therefrom in confronting relationship to the headed piston 40. It insures that, when the plate 22 retracts laterally and returns to closure of the seat 12, it will not travel too far and cause closure of the pilot hole 38 from the piston 40.

The opening 46 in the plate 22 has a tab 54 extending thereinto, and the disc 50 has a recess 56 formed therein. A compression spring 58 has an end thereof nested in the recess 56, and the other end thereof is piloted on the tab 54. Spring 58 causes the plate to retract laterally (to the right, as viewed in FIG. 1), as it descends onto the seat 12.

As disclosed and explained herein, then, the valve 12 will have a long and efficient life, as the valving plate 22 moves diagonally upon removal from, and closure onto the seat 12. Valve 10, clearly, experiences lower opening and closing impact velocities. It offers the benefit of an increased effective fluid flow area, and requires a minimum of machining. It has few component parts and is easy to maintain and service. Too, it presents the possibility of obviating any need for unloader mechanisms.

While I have described my invention in connection with a specific embodiment of the novel valve 10, it is to be clearly understood that this is done only by way of example, and not as a limitation to the scope of the invention, as set forth in the objects thereof and in the appended claims.

I claim:

1. A plate-type, unidirectional-flow, fluid control valve, comprising:

a valve seat; and a valve guard coupled to said valve seat; wherein said guard and said seat have means cooperative for forming a chamber therebetween; and a valving plate interposed between said seat and guard, and movable within said chamber for removal from closure thereof upon said seat toward said guard; wherein said seat, guard and plate are apertured to (a) accommodate fluid flow through said valve when said plate removes from said seat, and (b) prohibit fluid flow therethrough when said plate is in closure of, and upon said seat; and means confined within said valve, and responsive to fluid pressure addressed to said seat, for moving said plate laterally within said chamber.

2. A plate-type, unidirectional-flow, fluid control valve, according to claim 1, wherein:

said plate moving means comprises a bearing surface formed on said plate, piston means for engaging said bearing surface, and means for displacing said piston means with fluid pressure.

3. A plate-type, unidirectional-flow, fluid control valve, according to claim 2, wherein:

said seat and said guard are coupled together by means of a stud in penetration of both said guard and seat;

said stud has a transverse bore formed therein;

said piston means comprises a headed piston slidably confined within said bore; and said stud has a pilot hole formed therein which opens, at one end thereof onto an outermost surface of said seat, and at the opposite end thereof onto said piston.

4. A plate-type, unidirectional-flow, fluid control valve, according to claim 2, wherein:

said plate moving means further comprises means for biasing said plate against lateral movement within said chamber.

5. A plate-type, unidirectional-flow, fluid control valve, according to claim 3, wherein:

said plate moving means further comprises means for biasing said plate against lateral movement within said chamber;

said stud has an abutment means set therewithin; and said biasing means comprises a compression spring interposed between said abutment means and said plate.

6. A plate-type, unidirectional-flow, fluid control valve, according to claim 5, wherein:

said abutment means comprises a disc;

said disc has a recess formed therein;

said plate has a tab; and said spring is nested in said recess and piloted on said tab.

7. A plate-type, unidirectional-flow, fluid control valve, according to claim 5, wherein:

said abutment means comprises a disc; and said disc has a stand-off button extending therefrom and in confronting relationship to said headed piston.

8. A plate-type, unidirectional-flow, fluid control valve, according to claim 1, wherein:

said plate has a given thickness; and said chamber has a depth considerably greater than said thickness of said plate to accommodate elevation of said plate from said seat.

9. A plate-type, unidirectional-flow, fluid control valve, according to claim 1, wherein:

said plate has a maximum width; and said chamber has a width greater than said maximum width of said plate to accommodate lateral movement of said plate within said chamber.

10. A plate-type, unidirectional-flow, fluid control valve, comprising:

a valve seat; and a valve guard coupled to said valve seat; wherein said guard and said seat have means cooperatively forming a chamber therebetween; and a valving plate interposed between said seat and guard, and movable within said chamber for removal from closure thereof upon said seat toward said guard; wherein said seat, guard and plate are apertured to (a) accommodate fluid flow through said valve when said plate removes from said seat, and (b) prohibit fluid flow therethrough when said plate is in closure of, and upon said seat;

said plate has a maximum width and a given thickness;

said chamber forming means comprises forming a chamber having a depth considerably greater than said thickness of said plate, and a width greater than said maximum width of said plate, to accommodate elevation of said plate from said seat and lateral movement of said plate within said chamber; and means within said valve, and responsive to fluid pressure addressed to said seat, for moving said plate laterally within said chamber.

11. A plate-type, unidirectional-flow, fluid control valve, according to claim 10, wherein:

said seat and guard are coupled together by means of a stud in penetration of said seat, plate and guard;

said stud has a transverse bore formed therein; and said plate moving means comprises a headed piston, having an extending rod engaged with said plate, slidably confined within said bore.

* * * * *